(12) United States Patent
Tanaka

(10) Patent No.: US 7,728,919 B2
(45) Date of Patent: Jun. 1, 2010

(54) LIQUID CRYSTAL MODULE HAVING FLEXIBLE PRINTED WIRING BOARDS AND A HOUSING COMPRISING MULTIPLE RECESSES TO ACCOMMODATE THEM

(75) Inventor: Mitsuru Tanaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 92 days.

(21) Appl. No.: 11/944,751

(22) Filed: Nov. 26, 2007

(65) Prior Publication Data

US 2008/0123015 A1    May 29, 2008

(30) Foreign Application Priority Data

Nov. 27, 2006    (JP) ............................. 2006-009607

(51) Int. Cl.
G02F 1/1333 (2006.01)
G02F 1/1345 (2006.01)
F21V 7/04 (2006.01)

(52) U.S. Cl. .................... 349/58; 349/150; 362/633

(58) Field of Classification Search ............. 349/58–60, 349/150; 362/630–633
See application file for complete search history.

(56) References Cited

U.S. PATENT DOCUMENTS 6,961,103 B2 * 11/2005 Sung et al. .................... 349/58

2006/0119761 A1 * 6/2006 Okuda ......................... 349/58
2006/0120543 A1 * 6/2006 Kobayashi et al. .......... 381/152

FOREIGN PATENT DOCUMENTS

| JP | 2005-292284 A | 10/2005 |
| JP | 2006-11441 A | 1/2006 |
| JP | 2006-139020 A | 6/2006 |

* cited by examiner

Primary Examiner—Andrew Schechter
Assistant Examiner—Michael Inadomi
(74) Attorney, Agent, or Firm—Global IP Counselors, LLP

(57) ABSTRACT

A liquid crystal module includes a liquid crystal panel, a light source, a frame, a first flexible printed wiring board and a second flexible printed wiring board. The frame houses the liquid crystal panel and the light source. The frame has a side face with a main access component and first and second sub-access components. The first flexible printed wiring board extends through the main access component. The first flexible printed wiring board is electrically coupled to one of the liquid crystal panel and the light source. The second flexible printed wiring board extends through one of the first and second sub-access components. The second flexible printed wiring board is electrically coupled to the other of the liquid crystal panel and the light source.

9 Claims, 4 Drawing Sheets

LIQUID CRYSTAL MODULE HAVING FLEXIBLE PRINTED WIRING BOARDS AND A HOUSING COMPRISING MULTIPLE RECESSES TO ACCOMMODATE THEM

CROSS-REFERENCE TO RELATED APPLICATIONS

This application claims priority to Japanese Utility Model Application No. 2006-009607 filed on Nov. 27, 2006. The entire disclosure of Japanese Utility Model Application No. 2006-009607 is hereby incorporated herein by reference.

BACKGROUND OF THE INVENTION

1. Field of the Invention

The present invention generally relates to a liquid crystal module. More specifically, the present invention relates to a liquid crystal module having a flexible printed wiring board.

2. Background Information

A conventional liquid crystal module includes a light reflecting sheet, a light guide plate, a light diffusing sheet, a prism sheet, a liquid crystal panel and a frame. The light guide plate has a light source disposed at a side end face. The light source is connected to a sub-flexible printed board. The liquid crystal panel is connected to a main flexible printed board. The light reflecting sheet, the light guide plate, the light diffusing sheet, the prism sheet and the liquid crystal panel are stacked and housed in the frame. With the liquid crystal module, the frame is redesigned and produced every time the shape or location of the sub-flexible printed board or the main flexible printed board varies. Therefore, the cost of the liquid crystal module is increased.

With another conventional liquid crystal display device, a wiring board is taken off along a surface of a second rear frame from between a first rear frame and the second rear frame (see Japanese Laid-Open Patent Application No. 2006-139020, for example). A terminal part of the wiring board is taken off from the second rear frame to an outer side of the liquid crystal display device. As a result, the terminal part of the wiring board protrudes to the outside at a place desired merely by changing a shape of the wiring board, but without changing shapes of the first and second rear frames.

This liquid crystal display device makes use of a special access method in which the wiring board extends along the surface of the second rear frame from between the first rear frame and the second rear frame. As a result, the shapes of the first and second rear frames are shared with different models. However, this structure cannot be applied to a liquid crystal module in which a reflecting sheet, a light guide plate, a light diffusing sheet, a prism sheet and a liquid crystal panel are stacked and housed in a rectangle frame. Therefore, it is difficult to achieve a shared (common) frame for the liquid crystal module with this structure.

A conventional electronic device includes a liquid crystal panel and an FPC (Flexible Printed Circuit) connected to the liquid crystal panel (see Japanese Laid-Open Patent Application No. 2005-292284, for example). The FPC has a main FPC and an I/F-use FPC. The main FPC is shared. The I/F-use FPC is changed according to specifications of the electronic device. With the electronic device, sharing the main FPC is accomplished by dividing the FPC connected to the liquid crystal panel into the main FPC and the I/F-use FPC.

With a conventional display device, a single FPC is shared by a main display component and a sub-display component (Japanese Laid-Open Patent Application No. 2006-11441).

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a liquid crystal module with which a manufacturing cost is reduced.

In accordance with one aspect of the present invention, a liquid crystal module includes a liquid crystal panel, a light source, a frame, a first flexible printed wiring board and a second flexible printed wiring board. The frame houses the liquid crystal panel and the light source. The frame has a side face with a main access component and first and second sub-access components. The first flexible printed wiring board extends through the main access component. The first flexible printed wiring board is electrically coupled to one of the liquid crystal panel and the light source. The second flexible printed wiring board extends through one of the first and second sub-access components. The second flexible printed wiring board is electrically coupled to the other of the liquid crystal panel and the light source.

With the liquid crystal module of the present invention, it is possible to provide a liquid crystal module with which a manufacturing cost is reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
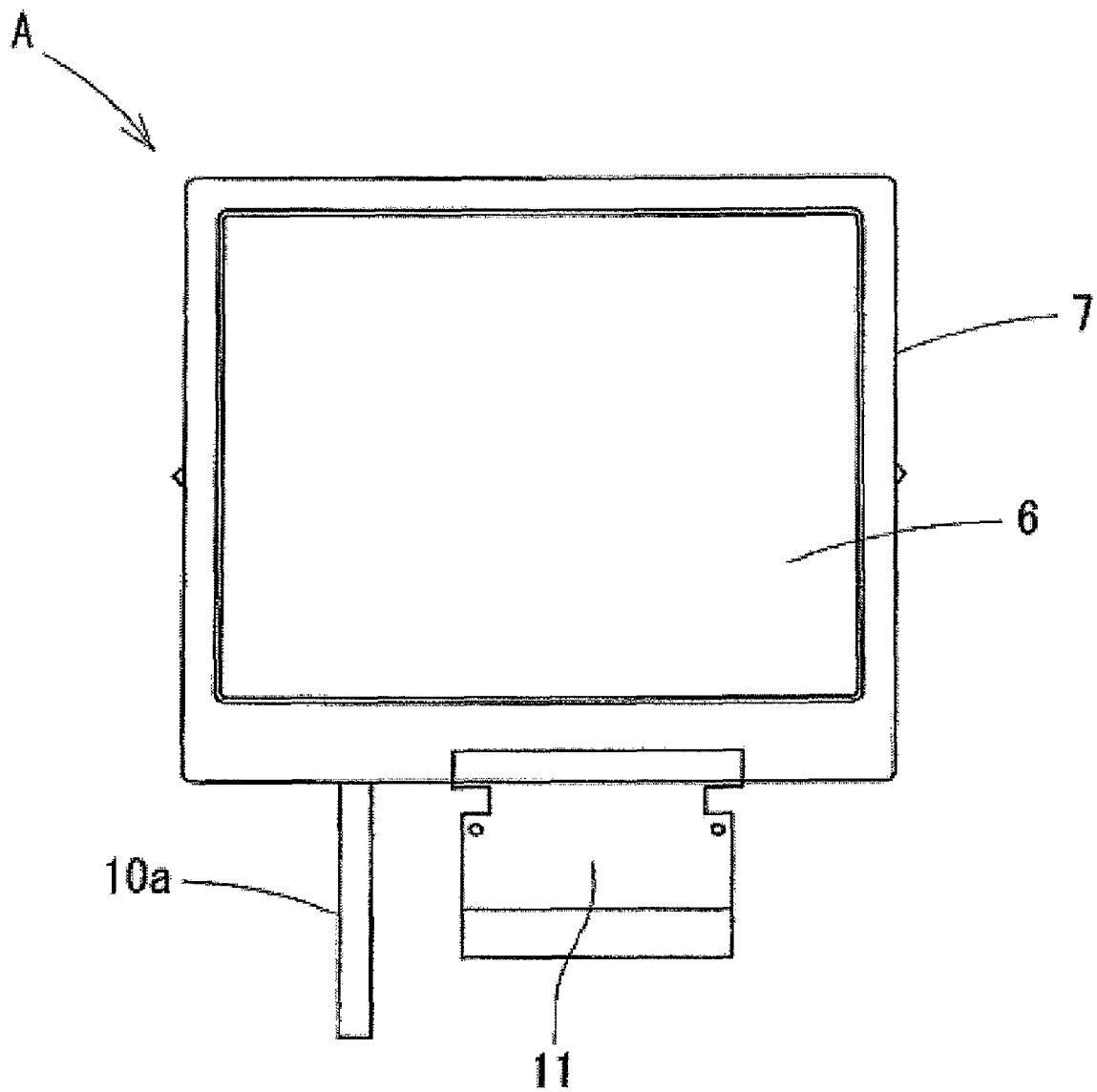
FIG. 1 is a top plan view of a first liquid crystal module in accordance with one embodiment of the present invention.
Figure 2:
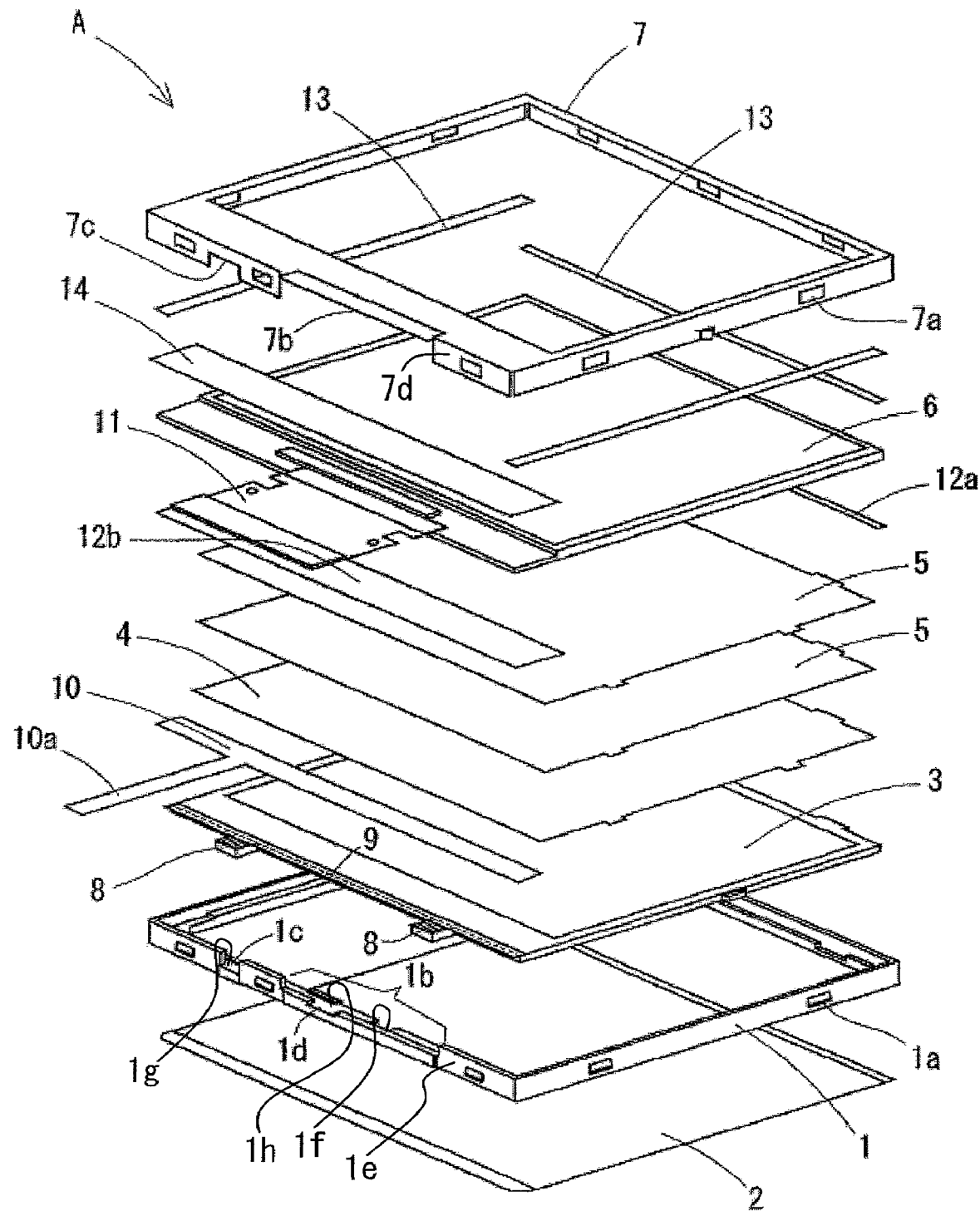
FIG. 2 is an exploded perspective view of the first liquid crystal module illustrated in FIG. 1.
Figure 3:
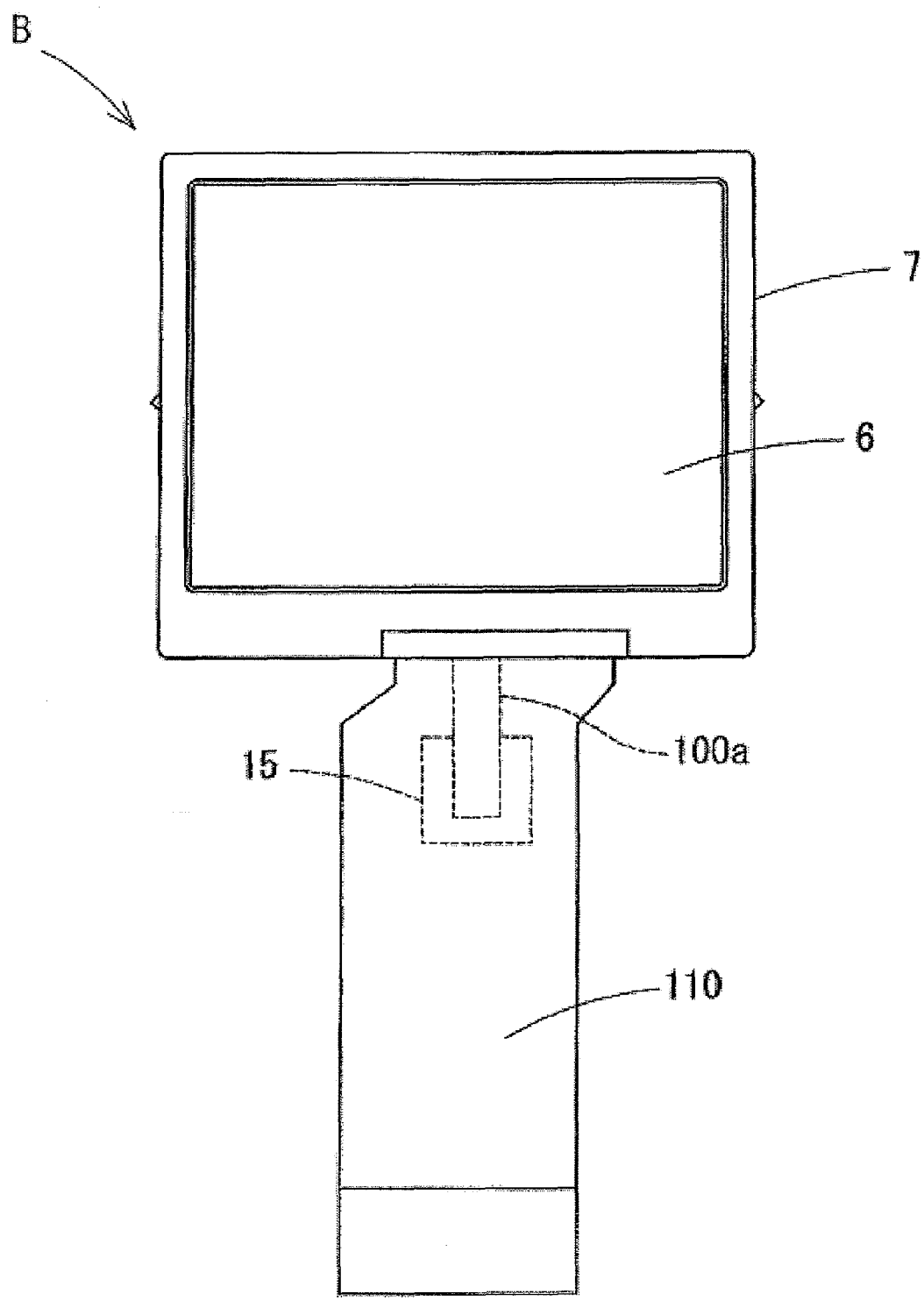
FIG. 3 is a top plan view of a second liquid crystal module in accordance with one embodiment of the present invention.
Figure 4:
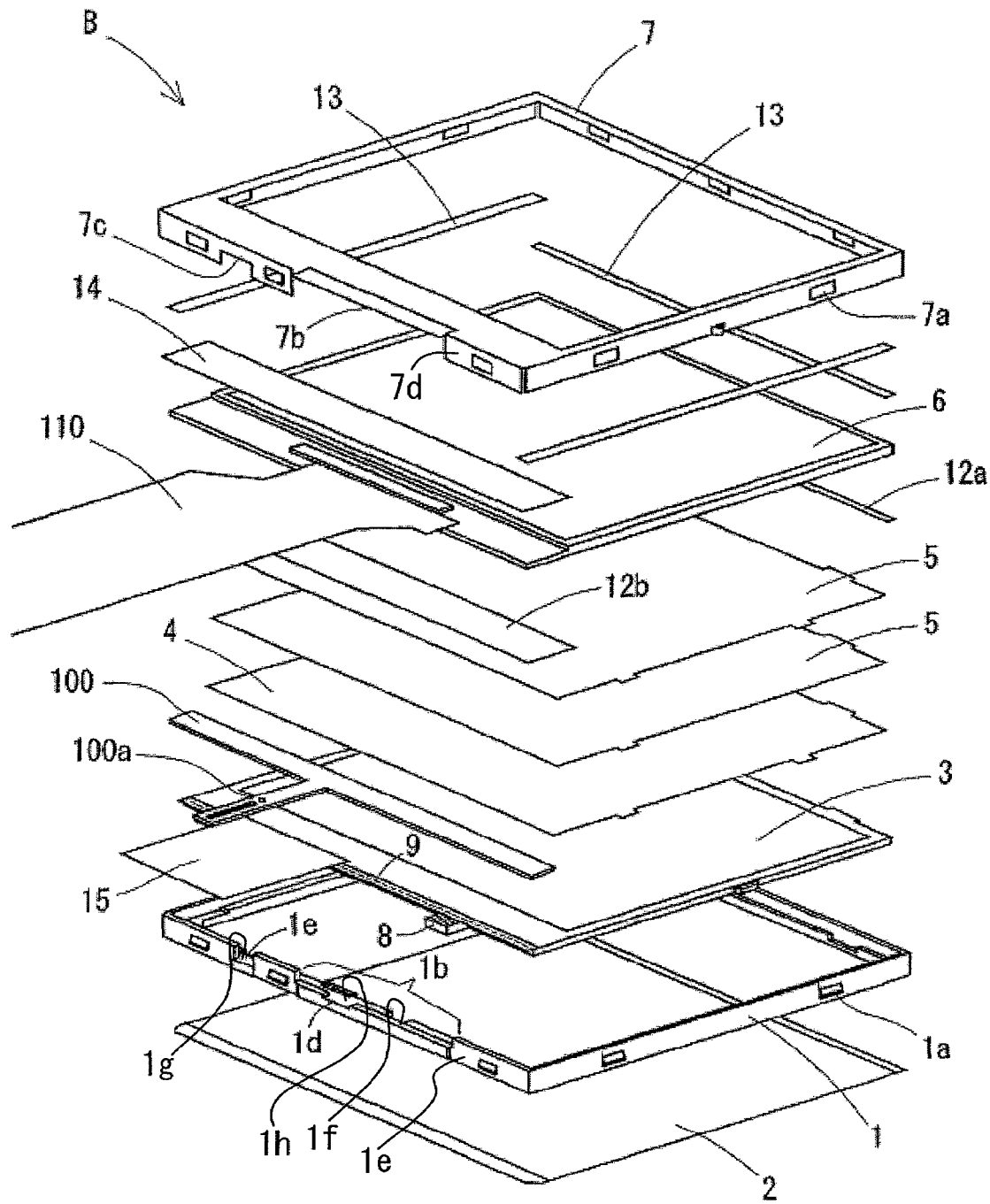
FIG. 4 is an exploded perspective view of the second liquid crystal module illustrated in FIG. 3.

FIG. 1 is a top plan view of a first liquid crystal module A. FIG. 2 is an exploded perspective view of the first liquid crystal module A. FIG. 3 is a top plan view of a second liquid crystal module B. FIG. 4 is an exploded perspective view of the second liquid crystal module B.

The first liquid crystal module A includes a frame 1 (e.g., housing means), a reflecting sheet 2, a light guide plate 3, a light diffusing sheet 4, two prism sheets 5, a liquid crystal panel 6 (e.g., electric component means) and a bezel 7. The frame 1 has a rectangle shape. The frame 1 is made of a synthetic resin. The reflecting sheet 2 has high optical reflectivity. The light guide plate 3 is made of a synthetic resin with transparency.

The reflecting sheet 2, the light guide plate 3, the light diffusing sheet 4, the prism sheets 5 and the liquid crystal panel 6 are stacked and housed inside the frame 1. The bezel 7 has a rectangle shape. The bezel 7 is made of metal. The bezel 7 is fitted over the frame 1. Specifically, the frame 1 has engagement tabs 1a formed on side faces of the frame 1. The bezel 7 has a plurality of engagement openings 7a formed on side faces of the bezel 7. The engagement tabs 1a of the frame 1 are engaged in the engagement openings 7a of the bezel 7, respectively, so that the frame 1 and the bezel 7 are assembled integrally and do not come apart.

A first main flexible printed wiring board 11 (e.g., first flexible printed wiring board or first electric connection means) is connected to the liquid crystal panel 6 for supplying electric power and data to the liquid crystal panel 6. A connection portion between the liquid crystal panel 6 and the first main flexible printed wiring board 11 is covered with insulating tape 14.

A plurality of LEDs 8 (e.g., light source) is disposed as light sources at a side end face of the light guide plate 3. Specifically, the LEDs 8 are fastened with reflective tape 9 at two locations along the side end face of the light guide plate 3. A first sub-flexible printed wiring board 10 (e.g., second flexible printed wiring board or second electric connection means) is connected to the LEDs 8 with the first sub-flexible printed wiring board 10 superposing over the LEDs 8 and the reflective tape 9. Specifically, the first sub-flexible printed wiring board 10 are connected and fixed with an electroconductive adhesive or the like to the LEDs 8.

Spacers 12a and 12b are disposed between the prism sheets 5 and the liquid crystal panel 6 for preventing contact between the prism sheets 5 and the liquid crystal panel 6. A masking tape 13 is disposed between the liquid crystal panel 6 and the bezel 7.

The frame 1 has a main access component 1b (e.g., main access means) and first and second sub-access components 1c and 1d (e.g., first and second sub-access means). The main access component 1b is formed on a side face 1e of the frame 1, which is the same side as the side where the LEDs 8 are provided. The main access component 1b includes a wide recess for an external access of the first main flexible printed wiring board 11. The first and second sub-access components 1c and 1d include narrow recesses for an external access of two types of LED-use flexible printed wiring board having different shapes and access locations (e.g., the first sub-flexible printed wiring boards 10 and a second sub-flexible printed wiring board 100). The narrow recesses are narrower than the wide recess. The first sub-access component 1c is formed on the side face 1e of the frame 1 next to the main access component 1b. The second sub-access component 1d is formed integrally with the main access component 1b. Specifically, the second sub-access component 1d is formed at a bottom portion if of the wide recess of the main access component 1b so that a bottom portion 1h of the second sub-access component 1d is located lower than the bottom portion if of the main access component 1b relative to a surface of the bottom portion if of the main access component 1b. The bottom portion 1h of the second sub-access component 1d is located at the same height as a bottom portion 1g of the first sub-access component 1c. A width of the main access component 1b is set to be slightly greater than a width of the first main flexible printed wiring board 11. Therefore, the access of the first main flexible printed wiring board 11 is possible even though the shape and location of the first main flexible printed wiring board 11 are somewhat different.

The bezel 7 has a wide notch 7b and a narrow notch 7c. The wide notch 7b is formed on a side face 7d at a location corresponding to the main access component 1b of the frame 1. The narrow notch 7c is formed on the side face 7d next to the wide notch 7b. The narrow notch 7c is formed at a location corresponding to the first sub-access component 1c. The narrow notch 7c is formed narrower than the wide notch 7b. When the bezel 7 is fitted over the frame 1, an opening is formed by the main access component 1b and the wide notch 7b for the first main flexible printed wiring board 11 to extend out of the frame 1, and an opening is formed by the first sub-access component 1c and the narrow notch 7c for the first sub-flexible printed wiring board 10 to extend out of the frame 1.

The first sub-flexible printed wiring board 10 has a first extension piece 10a. The first extension piece 10a is formed to a side of the first sub-flexible printed wiring board 10 at a position offset from a lateral center of the first sub flexible printed wiring board 10. The first extension piece 10a extends to the outside of the first liquid crystal module A from the first sub-access component 1c. More specifically, the first extension piece 10a extends to the outside of the first liquid crystal module A from the opening formed between the first sub-access component 1c and the narrow notch 7c. The first main flexible printed wiring board 11 extends to the outside of the first liquid crystal module A from the main access component 1b of the frame 1. More specifically, the first main flexible printed wiring board 11 extends to the outside of the first liquid crystal module A from the opening formed between the main access component 1b and the wide notch 7b.

Meanwhile, the second liquid crystal module B also includes the frame 1, the reflecting sheet 2, the light guide plate 3, the light diffusing sheet 4, the prism sheets 5, the liquid crystal panel 6 and the bezel 7. In particular, the second liquid crystal module B shares the frame 1 with the first liquid crystal module A. In view of the similarity between the first and second liquid crystal modules A and B, the parts of the second crystal module B that are identical to the parts of the first liquid crystal module A will be given the same reference numerals as the parts of the first liquid crystal module A. Moreover, the descriptions of the parts of the second liquid crystal module B that are identical to the parts of the first liquid crystal module B may be omitted for the sake of brevity.

A second main flexible printed wiring board 110 (e.g., first flexible printed wiring board or first electric connection means) is connected to the liquid crystal panel 6 for supplying electric power and data to the liquid crystal panel 6. The second main flexible printed wiring board 110 has a different shape from the shape of the first main flexible printed wiring board 11 for the first liquid crystal module A. Specifically, the second main flexible printed wiring board 110 is longer than the first main flexible printed wiring board 11. However, the locations and widths of the first and second main flexible printed wiring boards 11 and 110 are substantially the same. Therefore, the second main flexible printed wiring board 110 extends out from the main access component 1b of the frame 1. More specifically, the second main flexible printed wiring board 110 extends to the outside of the second liquid crystal module B from the opening formed between the main access component 1b and the wide notch 7b.

A second sub-flexible printed wiring board 100 (e.g., second flexible printed wiring board or second electric connection means) is connected to the LEDs 8. The second sub-flexible printed wiring board 100 has a different shape from the first sub-flexible printed wiring board 10. The second sub-flexible printed wiring board 100 has a different location from the first flexible printed wiring board 10. In particular, the second sub-flexible printed wiring board 100 has a second extension piece 100a. The second extension piece 100a is formed substantially at a lateral center of the second sub-flexible printed wiring board 100. The second extension piece 100a is superposed on a rear side of the second main flexible printed wiring board 110. In other words, the second extension piece 100a is formed at a lateral position overlapping the second main flexible printed wiring board 110. The second extension piece 100a extends out from the second sub-access component 1d of the frame 1 corresponding to the second extension piece 100a. More specifically, the second sub-flexible printed wiring board 100 extends to the outside of the second liquid crystal module B from an opening formed between the second sub-access component 1d and the wide notch 7b.

Solder is applied to a terminal part at a distal end of the second extension piece 100a. Then, the terminal part of the second extension piece 100a is connected and fixed to the second main flexible printed wiring board 110 by thermocompression bonding. As a result, the second main flexible printed wiring board 110 and the second sub-flexible printed wiring board 100 are mechanically and electrically connected. Thus, the second main flexible printed wiring board 110 and the second sub-flexible printed wiring board 100 become tractable. Furthermore, a connection between the second liquid crystal module B and a liquid crystal display device having the second liquid crystal module B is simplified. The distal end of the second extension piece 100a is covered with a thermally insulating cover tape 15 after the second extension piece 100a is connected to the second main flexible printed wiring board 110.

With the liquid crystal modules A and B, light from the LEDs 8 is incident on the light guide plate 3. Then, the light directly exits from a front side (exit face) of the light guide plate 3. The light is also reflected by the reflecting sheet 2 disposed on a rear side of the light guide plate 3. Then, the light exits from the front side of the light guide plate 3. The light is diffused through the light diffusing sheet 4. Then, a directionality of the light is increased by the prism sheets 5. The light illuminates the liquid crystal panel 6 from a rear side of the liquid crystal panel 6. As a result, a display surface of the liquid crystal panel 6 is seen clearly.

Since frame 1 includes the main access component 1b and the first and second sub-access components 1c and 1d, the first and second main flexible printed wiring boards 11 and 110 extend out from the main access component 1b, and the first and second sub-flexible printed wiring boards 10 and 100 extend out from either the first sub-access component 1c or the second sub-access component 1d.

Specifically, the locations of the first and second main flexible printed wiring boards 11 and 110 are substantially same, and the locations of the first and second sub-flexible printed wiring boards 10 and 100 are different. However, the frame 1 is shared between the liquid crystal modules A and B when two different types of the liquid crystal modules A and B are produced. Specifically, the frame 1 has the main access component 1b and the first and second sub-access components 1c and 1d. Therefore, compared to when dedicated frames are used in assembly for each different model, the manufacturing cost is reduced. Furthermore, it is also possible to avoid a trouble of sorting the dedicated frames for each different model.

With the liquid crystal module B, the second sub-access component 1d is formed integrally with the main access component 1b. The second main flexible printed wiring board 110 is taken off from the main access component 1b. Furthermore, the second sub-flexible printed wiring board 100 is superposed on the rear side of the second main flexible printed wiring board 110 and taken off from the second sub-access component 1d. Therefore, the second sub-flexible printed wiring board 100 is connected to the second main flexible printed wiring board 110 and consolidated into a single unit.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal module comprising:
a liquid crystal panel configured to display an image to a front side of the liquid crystal panel;
a light source;
a frame housing the liquid crystal panel and the light source, with the frame having a side face with a main access component and first and second sub-access components;
a first flexible printed wiring board extending through the main access component and being electrically coupled to one of the liquid crystal panel and the light source; and
a second flexible printed wiring board extending through one of the first and second sub-access components and being electrically coupled to the other of the liquid crystal panel and the light source, the main access component having a wide recess with the wide recess being depressed from a top surface of the side face of the frame, and the first and second sub-access components having first and second narrow recesses, respectively, the first narrow recess of the first sub-access component being depressed from the top surface of the side face of the frame at a location laterally spaced apart from the wide recess of the main access component when viewed from the front side of the liquid crystal panel, the second narrow recess of the second sub-access component being depressed from a bottom portion of the wide recess of the main access component.

2. The liquid crystal module according to claim 1, further comprising
a light guide plate disposed within the frame such that the light source is disposed at a side face of the light guide plate.

3. The liquid crystal module according to claim 2, further comprising
a light reflecting sheet, a light diffusing sheet and a prism sheet stacked within the frame.

4. The liquid crystal module according to claim 3, wherein
the first flexible printed wiring board is electrically coupled to the liquid crystal panel, and
the second flexible printed wiring board is electrically coupled to the light source.

5. The liquid crystal module according to claim 4, wherein
the second flexible printed wiring board extends out of the frame through the second sub-access component, and
the second flexible printed wiring board is electrically coupled to the first flexible board.

6. The liquid crystal module according to claim 1, wherein
the first flexible printed wiring board is electrically coupled to the liquid crystal panel, and
the second flexible printed wiring board is electrically coupled to the light source.

7. The liquid crystal module according to claim 6, wherein
the second flexible printed wiring board extends out of the frame through the second sub-access component, and
the second flexible printed wiring board is electrically coupled to the first flexible board.

8. The liquid crystal module according to claim 1, wherein
the wide recess of the main access component has a width that is wider than a width of the first flexible printed wiring board.

9. A display module comprising:
electric component means for displaying in an image to a front side of the electric component means;
housing means for housing the electric component means, the housing means including main access means for accessing an interior of the housing means from outside of the housing means, and first and second sub-access means for accessing the interior of the housing means from outside of the housing means; and
first and second electric connection means for electrically coupling to the electric component means through the main access means and one of the first and second sub-access means, respectively,
the main access means having a wide recess with the wide recess being depressed from a top surface of a side face of the housing means, and the first and second sub-access means having first and second narrow recesses, respectively, the first narrow recess of the first sub-access means being depressed from the top surface of the side face of the housing means at a location laterally spaced apart from the wide recess of the main access means when viewed from the front side of the electric component means, the second narrow recess of the second sub-access means being depressed from a bottom portion of the wide recess of the main access means.

* * * * *